United States Patent Office 2,973,301
Patented Feb. 28, 1961

2,973,301

SOFT GELATIN CAPSULE

Lyell J. Klotz, Cincinnati, Ohio, assignor to Lloyd Brothers, Inc., Cincinnati, Ohio, a corporation of Ohio No Drawing. Filed Mar. 12, 1959, Ser. No. 798,817

4 Claims. (Cl. 167—83)

The present invention relates to the soft gelatin capsule field and more specifically to improved soft gelatin capsules in which the gelatin making up the shell of the capsule is plasticized with 1,2,6-hexanetriol.

The use of soft gelatin capsules as a means for administering liquid pharmaceutical preparations of various sorts including solutions of the medicament or active drug in inert, non-toxic organic solvents such as mineral and vegetable oils, equivalent oily solvents such as liquid polyethylene glycols, and the like, are well known. As gelatin per se becomes hard and brittle and is unsuitable for use in the soft gelatin capsule field it has long been the established practice in the trade to plasticize the gelatin used in making soft gelatin capsules with about 15% up to about 22% by weight or more of glycerine. As glycerine plasticized soft gelatin capsules, however, tend to leak when used with certain organic solvents or certain pharmaceutical preparations or combinations of the same, various attempts have been made to improve the capsules so as to avoid what is known in the art as "leakers," i.e. capsules that leak at the seams on standing. These attempts have included the replacement of the glycerine in whole or in part with sorbitol, tanning of the glycerine plasticized gelatin shell by dipping in aqueous formaldehyde, coating of the shell with organic resins and the like, adding of resin solutions to the gelatin, etc. See Fox Patent 2,390,088. The replacement of the glycerine with sorbitol was found to materially reduce the leaker problem in some instances but in doing so presented still another problem. Specifically, it was found that so much sorbitol was required to plasticize the gelatin and to prepare a non-leaking capsule, that the capsule developed a "bloom" on its surface, i.e. became white and opaque due to crystallization of the sorbitol, and in this condition was unsaleable. Replacement of only part of the glycerine with sorbitol reduced the blooming problem but increased the leaking problem. Also, the use of mixtures of glycerine and sorbitol was found to pose still another problem, i.e. to increase the tendency of the capsules to collapse. When this takes place the capsules flatten, become misshapen and in this condition are also unsaleable. The other suggestions, tanning, use of resins, etc. were found objectionable due to costs and also because they prevented or materially retarded the dissolution of the capsule in the digestive tract.

It was found that the leaker problem was particularly critical when the soft gelatin capsules contained various solutions of dioctyl sodium sulfosuccinate or like agents which lower surface tension. See copending Klotz application Serial No. 737,226, filed May 23, 1958. As the return of "leakers" involved the loss, dollarwise, of substantial sums, extensive investigations were undertaken in an attempt to solve this problem. Included in these investigations were the use of various mixtures of sorbitol and glycerine as noted above as well as the use of different organic solvents for the sulfosuccinate. None proved to be satisfactory and it was decided in most instances to replace the widely used dioctyl sodium sulfosuccinate with dioctyl calcium sulfosuccinate when it was discovered that the use of the calcium salt, unlike the sodium salt, materially reduced leakage problems. See Klotz application supra. During the investigation and prior to this discovery, however, capsules containing the sodium salt of dioctyl sulfosuccinate acid had also been made with gelatin plasticized with 1,2,6-hexanetriol. These capsules along with other anticipated failures had more or less been forgotten or overlooked in view of the calcium salt development mentioned above. Later on when the 1,2,6-hexanetriol plasticized capsules were examined they were unexpectedly found to be substantially free from leakers.

Except for the replacement of glycerine or mixtures of glycerine and sorbitol with the 1,2,6-hexanetriol, the gelatin, i.e. aqueous gelatin solutions containing the plasticizer, are prepared and formed into plates, sheets or bands for capsulating by conventional procedures in this art. The following examples will serve to illustrate the invention.

*Example I*

|  | Lbs. |
|---|---|
| Gelatin | 5.5 |
| 1,2,6-hexanetriol | 1.5 |
| Water | 4.5 |

The 1,2,6-hexanetriol is first added to the water and the gelatin (medium ground) is then added to the resulting solution with mixing. After standing overnight the resulting mixture is placed in a gel tank and heated for about 1–2 hours at about 60° C. The resulting melt (gelatin solution) is then formed into plates or sheets or bands for use in the capsulating machine in accordance with standard practices in the art. See Scherer Patent 1,970,396. The capsule product of this example, after drying, contains about 22% of 1,2,6-hexanetriol, based on the weight of the gelatin, and is a medium (semi-hard) soft gelatin capsule.

*Example II*

|  | Lbs. |
|---|---|
| Gelatin | 5.5 |
| 1,2,6-hexanetriol | 2.5 |
| Water | 4.5 |

The capsule product of this example is produced by the procedure of Example I using the amounts of gelatin and hexanetriol plasticizer specified above. It contains about 30% by weight of the hexanetriol, based on the gelatin, and is a relatively soft, soft gelatin capsule.

*Example III*

|  | Lbs. |
|---|---|
| Gelatin | 5.5 |
| 1,2,6-hexanetriol | 0.7 |
| Water | 4.5 |

The capsule product of this example is also produced by the procedure described in Example I. Unlike the products of Examples I and II, the product of this example contains about 10% by weight of the hexeanetriol, based on the gelatin, and is a relatively hard, soft gelatin capsule.

The 1,2,6-hexanetriol can also be used with other plasticizers such as glycerine and sorbitol and mixtures of the same. The following examples are illustrative.

*Example IV*

|  | Lbs. |
|---|---|
| Gelatin | 5.5 |
| 1,2,6-hexanetriol | 1.0 |
| Glycerine | 0.4 |
| Water | 4.5 |

This product can be prepared by adding the gelatin to the mixture of water and plasticizers in accordance with Example I. It contains about 20% by weight of plasticizer of which about 14.5% is hexanetriol and produces a medium soft gelatin capsule.

*Example V*

| | Lbs. |
|---|---|
| Gelatin | 5.5 |
| 1,2,6-hexanetriol | 1.0 |
| Sorbitol | 0.4 |
| Water | 4.5 |

This product is prepared in accordance with Example IV. It also contains about 20% by weight of plasticizer of which about 14.5% is hexanetriol.

*Example VI*

| | Lbs. |
|---|---|
| Gelatin | 5.5 |
| 1,2,6-hexanetriol | 0.7 |
| Glycerine | 0.3 |
| Sorbitol | 0.4 |
| Water | 4.5 |

This product is prepared in accordance with Example IV. It contains about 20% by weight of plasticizer of which about 10% is hexanetriol and like Examples IV and V produces a medium soft capsule.

Investigations have shown that the 1,2,6-hexanetriol can be used in about 10–30% by weight based on the weight of the gelatin used to prepare the capsules. Investigations have also shown that regardless of the use of glycerine or sorbitol or mixtures of the same, that the gelatin should contain at least 10% and preferably about 22% by weight of the 1,2,6-hexanetriol. The ratio of gelatin to water employed can vary on either side but is preferably employed in a ratio of about approximately 1 to 1 by weight. See Palermo et al. Patent 2,578,943.

The gelatin shell of the capsule after drying, e.g. with infra-red heating, standing in shallow trays, etc. ordinarily contains about 8–10% moisture and the gelatin ordinarily used to prepare the gelatin-plasticizer mix also may contain about the same amount of moisture. The percentages or ratios given herein are on the "dry" or moisture-free basis.

The reasons why the 1,2,6-hexanetriol materially reduces leakage in soft gelatin capsules, i.e. development of "leakers," is not understood. It may be due to the fact that the 1,2,6-hexanetriol provides for better sealing at the seams of the capsule shell; or that, unlike glycerine, the 1,2,6-hexanetriol is comparatively stable to changes in humidity, etc. Regardless of the reasons involved, investigations have demonstrated that the 1,2,6-hexanetriol plasticized soft gelatin capsules can be used to advantage in administering liquid pharmaceutical preparations. Illustrative examples are the use of the improved capsules to administer oil solutions of dioctyl sodium sulfosuccinate including the mineral oil solution described on page 4 of Vaughan application Serial No. 537,873, filed September 30, 1955, now abandoned, as well as similar solutions containing 1,8-dihydroxyanthraquinone such as described in Example II of Vaughan Patent 2,847,346. The improved capsules of the present invention can also be used to advantage with oil solutions such as the corn oil solutions of calcium dioctyl sulfosuccinate described in Examples II and III of the above referred to Klotz application Serial No. 737,226, filed May 23, 1958, as well as with the liquid polyethylene glycol solution of calcium dioctyl sulfosuccinate containing 1,8-dihydroxyanthraquinone described in Example IV of Klotz application Serial No. 752,410, filed August 1, 1958. As a single "leaker," i.e. one leaking capsule, in a container generally contaminates the container and makes the entire contents unsaleable, the leaker problem can be and is a serious one. In view of this, and as this problem is always present in the soft gelatin capsule field, it is highly desirable to employ all practical means to prevent the development of "leakers."

It is claimed:
1. A soft gelatin capsule adaptable for use in the pharmaceutical field characterized by having the gelatin of said capsule plasticized with about 10–30% by weight of 1,2,6-hexanetriol.
2. A soft gelatin capsule in accordance with claim 1 containing an oil solution of dioctyl sodium sulfosuccinate.
3. A soft gelatin capsule in accordance with claim 1 containing an oil solution of calcium dioctyl sulfosuccinate.
4. A capsule in accordance with claim 3 which also contains 1,8-dihydroxyanthraquinone.

References Cited in the file of this patent

UNITED STATES PATENTS

| 2,537,726 | Wittcoff | Jan. 9, 1951 |
| 2,664,366 | Wilson | Dec. 29, 1953 |
| 2,780,355 | Palermo | Feb. 5, 1957 |
| 2,847,346 | Vaughan | Aug. 12, 1958 |
| 2,899,361 | McMillian | Aug. 11, 1959 |

FOREIGN PATENTS

| 501,135 | Canada | Mar. 30, 1954 |